(12) United States Patent
Payne

(10) Patent No.: US 7,035,509 B2
(45) Date of Patent: *Apr. 25, 2006

(54) SEMICONDUCTOR OPTICAL WAVEGUIDE DEVICE

(75) Inventor: Frank Philip Payne, Oxfordshire (GB)

(73) Assignee: Bookham Technology, PLC, Northamptonshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/051,070

(22) Filed: Feb. 4, 2005

(65) Prior Publication Data
US 2005/0244104 A1 Nov. 3, 2005

Related U.S. Application Data

(63) Continuation of application No. 10/444,862, filed on May 22, 2003, now Pat. No. 6,853,775.

(30) Foreign Application Priority Data
May 25, 2002 (GB) ................... 0212092.1

(51) Int. Cl.
G02B 6/10 (2006.01)
G02B 6/26 (2006.01)

(52) U.S. Cl. ..................... 385/43; 385/50; 385/129

(58) Field of Classification Search ..................... None
See application file for complete search history.

(56) References Cited

U.S. PATENT DOCUMENTS 5,153,935 A   10/1992   Mueller
5,323,476 A   6/1994    Mueller et al.
5,761,364 A   6/1998    Knapp et al.
6,108,478 A   8/2000    Harpin et al.
6,293,688 B1  9/2001    Deacon
6,381,380 B1  4/2002    Forrest et al.
6,466,717 B1  10/2002   Gonthier
6,643,433 B1  11/2003   Gonthier et al.
6,681,069 B1* 1/2004    Galarza et al. ............... 385/50
2002/0012501 A1 1/2002  Tang et al.

FOREIGN PATENT DOCUMENTS

JP      5-8173704       10/1983
WO      WO 94/22038 A1  9/1994

OTHER PUBLICATIONS

Moerman, I., et al. "III-V semiconductor waveguiding devices using adiabatic tapers." *Microelectronics Journal* 1994 25:675-690.

* cited by examiner

Primary Examiner—Michelle Connelly-Cushwa
Assistant Examiner—Jerry T. Rahll
(74) Attorney, Agent, or Firm—Lahive & Cockfield, LLP; Anthony A. Laurentano

(57) ABSTRACT

A device comprises a tapered semiconductor optical waveguide which tapers, at an angle of taper with respect to a longitudinal axis of the waveguide, from a relatively wide region to a relatively narrow region, wherein the angle of taper varies along the length of the tapered waveguide such that at all points along the taper it is no greater than, and within a substantially constant angular separation of, the adiabatic limit of the fundamental mode of the waveguide at that point along the taper.

20 Claims, 3 Drawing Sheets

SEMICONDUCTOR OPTICAL WAVEGUIDE DEVICE

This Application is a Continuation of application Ser. No. 10/444,862 filed on May 22, 2003, now U.S. Pat. No. 6,853,775 which claims priority to GB 0212092.1, filed May 25, 2002.

The present invention relates to semiconductor waveguides, and in particular relates to tapered waveguides, for example which are used to interconnect relatively wide waveguides with relatively narrow waveguides, and in particular to interconnect an optical fibre with a single mode semiconductor waveguide. The invention is described primarily in relation to rib waveguides (for example fabricated by photolithography and etching processes), but it is applicable to semiconductor waveguides generally.

The use of high refractive index materials, for example silicon semiconductor, in the design and fabrication of optical waveguide components, presents special problems with respect to the coupling of light from a single mode optical fibre (for example with a spot size of about nine microns diameter), into a single mode semiconductor waveguide with a cross sectional size of perhaps only a few microns. If significant coupling loss between the fibre and semiconductor waveguide is to be avoided then a tapered waveguide structure is necessary to uniformly transform the optical mode of one waveguide into that of the other. Many such mode transformers are described in the literature, but, due to their complexity, most are incapable of being manufactured reliably and with adequate performance. One exception to this is the tapered waveguide structure developed by Bookham Technology, for example as disclosed in U.S. Pat. No. 6,108,478, or co-pending UK Patent Application No. 0106743.8, where the fundamental mode of a large multimode rib waveguide is transformed into the mode of a smaller single mode rib waveguide.

The accompanying drawings will be referred to, by way of example. The drawings are as follows.

Figure 1:
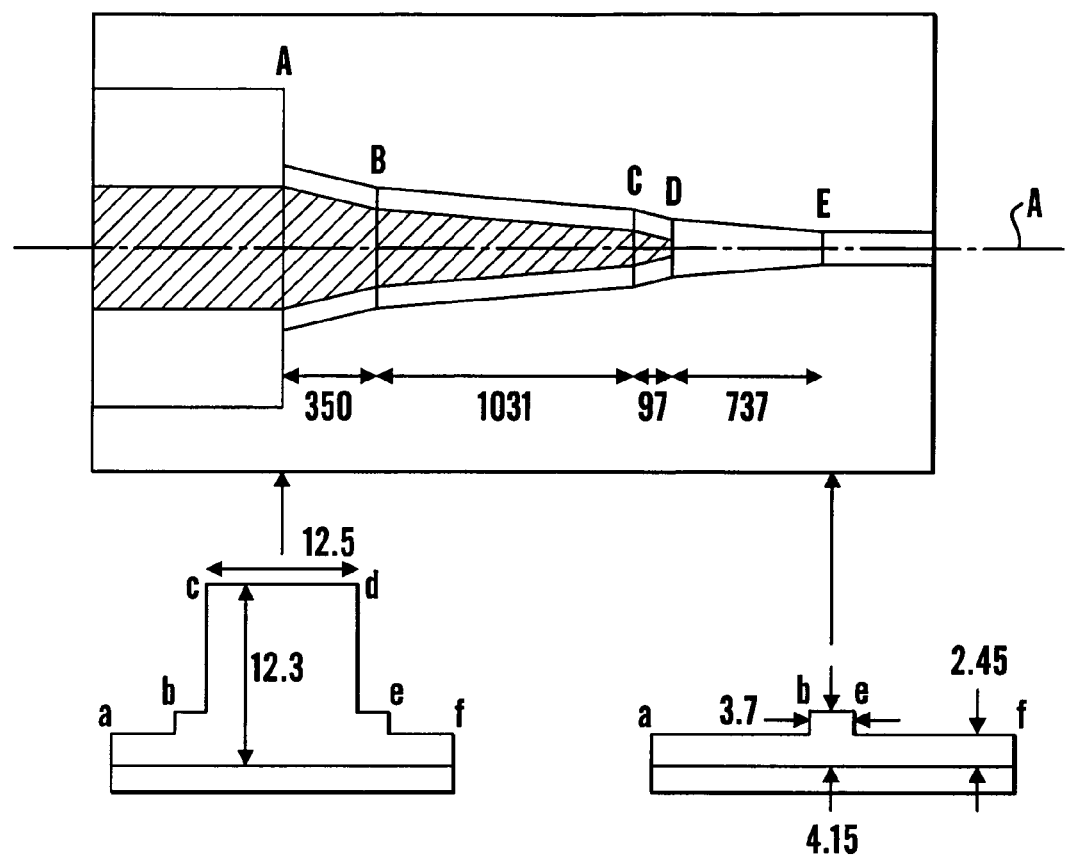
FIG. 1 shows, schematically, views of a known silicon rib tapered waveguide.

FIG. 1 shows, schematically, a plan view of a Bookham Technology tapered silicon rib waveguide (not to scale), and cross sectional views of the start and end of the taper. Some typical dimensions for the taper are shown in microns. The width of the waveguide shown in FIG. 1 reduces gradually along its length. The taper functions by gradually pushing the fundamental optical mode which initially substantially fills the rib section bcde down into the slab guide regions be on either side, which then form a new rib guide at the end of the taper. A perfectly fabricated waveguide of this design operates with low loss. In practice, imperfections in waveguide processing can result in the taper angle exceeding the adiabatic limit (i.e. the maximum angle of taper at which the waveguide retains substantially the same optical mode along its length), with the result that coupling to higher order modes can occur along the taper, resulting in optical losses. Typical of the imperfections that can occur as a result of the etching process are notches 1 in the sides of the rib waveguide forming the taper, as shown in FIG. 2.

Figure 2:
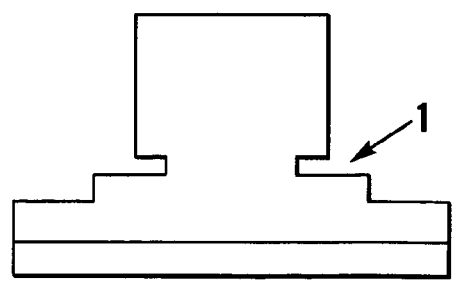
FIG. 2 shows, schematically, a cross-section through a rib waveguide containing imperfections resulting from the fabrication process.
Figure 3:
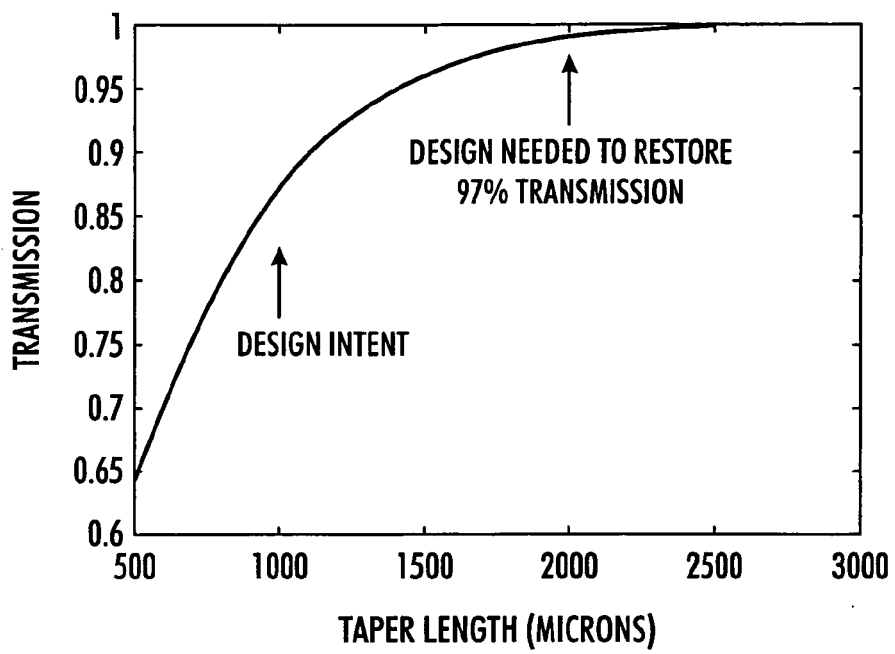
FIG. 3 is a graph showing optical transmission as a function of taper length through a waveguide taper section BC of FIG. 1 for a situation in which imperfections have been formed in the waveguide as shown in FIG. 2.

FIG. 2 shows, schematically, a cross-section through a rib waveguide in which there are notches 1, which are imperfections resulting from the etching fabrication process. The size of such notches can vary up to about 0.5×0.5 microns in size. Although normally small compared to the size of the waveguide forming the taper, such imperfections can result in the taper angle exceeding the adiabatic limit. The most straightforward way to overcome this problem would be to reduce the taper angle until the adiabatic limit is restored. However, this can result in inconveniently long tapers. This is illustrated by the graph of FIG. 3 which shows optical transmission as a function of taper length through the taper section BC of FIG. 1 for the situation where notches of 0.5×0.5 microns have been formed in the waveguide as shown in FIG. 2. For a perfect taper the design intent is typically a taper length of 1000 microns, for which optical transmission of about 97% is achievable. With the notches it is found that the transmission is reduced to about 85% and that to achieve a transmission of 97% the length of the taper section would have to be increased from 1000 to about 2000 microns, making the component impractically long.

Figure 4:
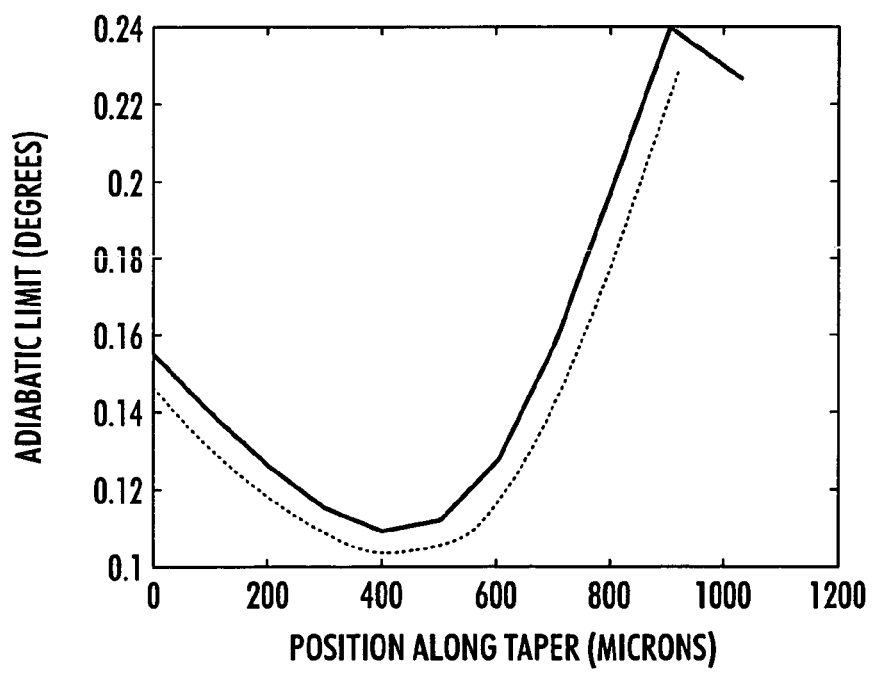
FIG. 4 is a graph showing a typical plot of the adiabatic limit (as explained below) for section BC of the tapered waveguide of FIG. 1 in which imperfections have been formed in the waveguide as shown in FIG. 2.

The inventor of the present invention has found that a much more efficient design for the taper of a tapered waveguide can be achieved by abandoning its linear profile and using a non-linear shape which is related to the adiabatic limit. If the beat length between the fundamental optical mode and the nearest higher order mode to which coupling is possible is $L_B$, then the adiabatic limit, $\theta_A = \rho/L_B$, and therefore the maximum possible taper angle $\theta$ along the taper must satisfy the following relationship:

$$\theta \leq \frac{\rho}{L_B}$$

Where $\rho$ is the taper half width. The graph (solid line) illustrated in FIG. 4 shows a typical plot of the adiabatic limit for section BC of the taper in FIG. 1 with a waveguide notch of 0.5×0.5 microns.

A taper that generally follows a curve set at a fixed angle below (i.e. a constant angular separation below) the adiabatic limit, such as the dotted curve shown in FIG. 4, will result in a minimum length taper for a given loss. For the section of taper BC in FIG. 1 with notches as shown in FIG. 2, a transmission of 98% is achievable in a taper following a curve 0.05 degrees below the adiabatic limit with a length of only 1206 microns, compared to a length of over 2000 microns that would be needed in a straight taper. (The dotted curve of FIG. 4 is an arbitrary constant angular separation below the adiabatic limit and is intended merely to illustrate this principle; the actual constant angular separation shown in FIG. 4 is not intended to have any special relevance.)

Accordingly, a first aspect of the invention provides a device comprising a tapered semiconductor optical waveguide which tapers, at an angle of taper with respect to a longitudinal axis of the waveguide, from a relatively wide region to a relatively narrow region, wherein the angle of taper varies along the length of the tapered waveguide such that at all points along the taper it is no greater than, and within a substantially constant angular separation of, the adiabatic limit of the fundamental mode of the waveguide at that point along the taper.

Preferably the relatively wide region of the tapered waveguide is a multimode region; preferably the relatively narrow region of the tapered waveguide is a single mode region. This applies to all aspects of the invention described and claimed herein. However, at least in the broadest aspects of the invention, the transition from the relatively wide region to the relatively narrow region of the waveguide may alternatively be multimode to multimode, or single mode to single mode. For embodiments in which the transition is between two single mode regions, maintaining the taper at no greater than the adiabatic limit suppresses coupling to radiation modes.

The angle of taper at any particular point along the tapered waveguide is the angle that a lateral surface (or, for curved waveguides, the tangent of the lateral surface) of the waveguide makes with respect to the longitudinal axis of the waveguide at that point. The waveguide will normally be symmetrical about the longitudinal axis, and therefore the angle of taper will normally be identical on both opposite sides of the waveguide at any particular point along the longitudinal axis.

Preferably the angle of taper at all points along the taper is a substantially constant angular separaton below the adiabatic limit of the fundamental mode of the waveguide at that point along the taper.

Accordingly, a second aspect of the invention provides a device comprising a tapered semiconductor optical waveguide which tapers, at an angle of taper with respect to a longitudinal axis of the waveguide, from a relatively wide region to a relatively narrow region, wherein the angle of taper varies along the length of the tapered waveguide such that at all points along the taper it is a substantially constant angular separation below the adiabatic limit of the fundamental mode of the waveguide at that point along the taper.

As indicated above, by "adiabatic limit" is meant the maximum angle of taper at which the waveguide retains substantially the same optical mode along its length. By "adiabatic limit of the fundamental mode of the waveguide" is therefore meant the angle of taper at which the waveguide remains substantially in the fundamental mode (where the waveguide is multimode), at which it remains substantially in the single mode (where the waveguide is single mode), and at which the fundamental mode transforms into the single mode (where there is a transition from multimode to single mode). In the latter case, in essence, the fundamental mode and the single mode are substantially the same optical mode throughout the length of the taper.

A third aspect of the invention provides a process of fabricating a device comprising a tapered semiconductor optical waveguide which tapers, at an angle of taper with respect to a longitudinal axis of the waveguide, from a relatively wide region to a relatively narrow region, the process comprising fabricating the tapered waveguide such that the angle of taper varies along the length of the tapered waveguide such that at all points along the taper it is no greater than, and within a constant angular separation of, the adiabatic limit of the fundamental mode of the waveguide at that point along the taper.

A fourth aspect of the invention provides a process of fabricating a device comprising a tapered semiconductor optical waveguide which tapers, at an angle of taper with respect to a longitudinal axis of the waveguide, from a relatively wide region to a relatively narrow region, the process comprising fabricating the tapered waveguide such that the angle of taper varies along the length of the tapered waveguide such that at all points along the taper it is a substantially constant angular separation below the adiabatic limit of the fundamental mode of the waveguide at that point along the taper.

Preferably the substantially constant angular separation below the adiabatic limit of the fundamental mode of the waveguide is a substantially constant angular separation which is at least 1.0%, more preferably at least 5.0%, even more preferably at least 10.0%, especially at least 20.0%, of the adiabatic limit at any particular point along the taper. Preferably the substantially constant angular separation is no greater than 80%, more preferably no greater than 60%, even more preferably no greater than 50%, especially no greater than 30%, of the adiabatic limit at any particular point along the taper. For example, if the adiabatic limit at a particular point is 0.20 degrees, a substantially constant angular separation of 0.05 degrees below the adiabatic limit at that point is a taper angle of 0.15 degrees, and the angular separation from the adiabatic limit is therefore 25% of the adiabatic limit at that point. However, as the adiabatic limit varies along the length of the taper, the constant angular separation of 0.05 degrees will be equivaient to varying percentages of the adiabatic limit (while remaining constant at 0.05 degrees smaller than the adiabatic limit).

Preferably the substantially constant angular separation is in the range of 0.001 degrees to 0.5 degrees, more preferably 0.01 degrees to 0.2 degrees, especially 0.02 degrees to 0.1 degrees, for example 0.05 degrees.

Figure 5:
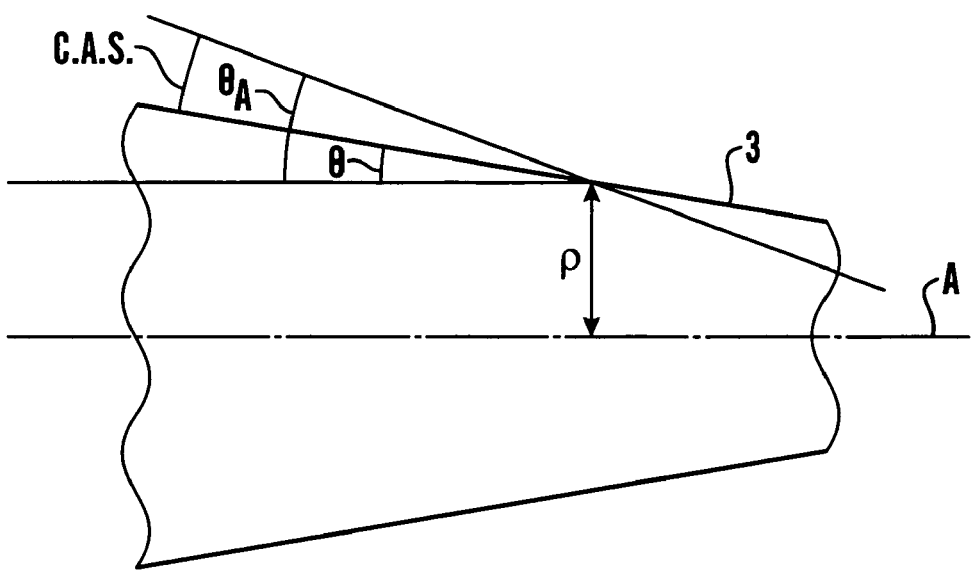
FIG. 5 is a schematic representation indicating various aspects of the invention.

FIG. 5 is a schematic representation (not to scale) of part of a tapered waveguide 3 of a device according to the invention. The angle of taper θ is indicated, this being the angle that the side surface of the waveguide makes with a line parallel to the longitudinal axis A of the waveguide. The adiabatic limit $\theta_A$ of the tapered waveguide is indicated, and this is an angle (also with respect to a line parallel to the longitudinal axis A) that is greater than the actual angle of taper by a constant angular separation C.A.S. as indicated in the figure.

Preferably, the angle of taper varies along the length of the tapered waveguide such that there are at least two changes in the angle of taper.

A fifth aspect of the invention provides a device comprising a tapered semiconductor optical waveguide which tapers, at an angle of taper with respect to a longitudinal axis of the waveguide, from a relatively wide region to a relatively narrow region, wherein the angle of taper varies along the length of the tapered waveguide such that there are at least two changes in the angle of taper, and at all points along the taper the angle of taper is no greater than the adiabatic limit of the fundamental mode of the waveguide at that point along the taper.

According to a sixth aspect, the invention provides a process of fabricating a device comprising a tapered semiconductor optical waveguide which tapers, at an angle of taper with respect to a longitudinal axis of the waveguide, from a relatively wide region to a relatively narrow region, the process comprising fabricating the tapered waveguide such that the angle of taper varies along the length of the tapered waveguide such that there at least two changes in the angle of taper, and at all points along the taper the angle of taper is no greater than the adiabatic limit of the fundamental mode of the waveguide at that point along the taper.

Preferably there are at least three changes in the angle of taper along the length of the tapered waveguide. More preferably there are at least four, even more preferably at least five, yet more preferably at least six, especially at seven changes in the angle of taper along the length of the tapered waveguide. At least in some embodiments of the invention the angle of taper may vary substantially continuously along the length of the waveguide (i.e. the taper is substantially continuously curved); in such embodiments the tapered waveguide effectively has an infinite number of changes in the angle of taper, along its length. However, such embodiments are currently less preferred than embodiments in which the changes in taper angle are discontinuous. That is, the tapered waveguide preferably comprises a series of substantially straight tapered sections, each of which has a different angle of taper to that of its immediately neighbouring section(s). Such embodiments are preferred because their fabrication is generally easier than that of continuously curved tapers.

Figure 6:
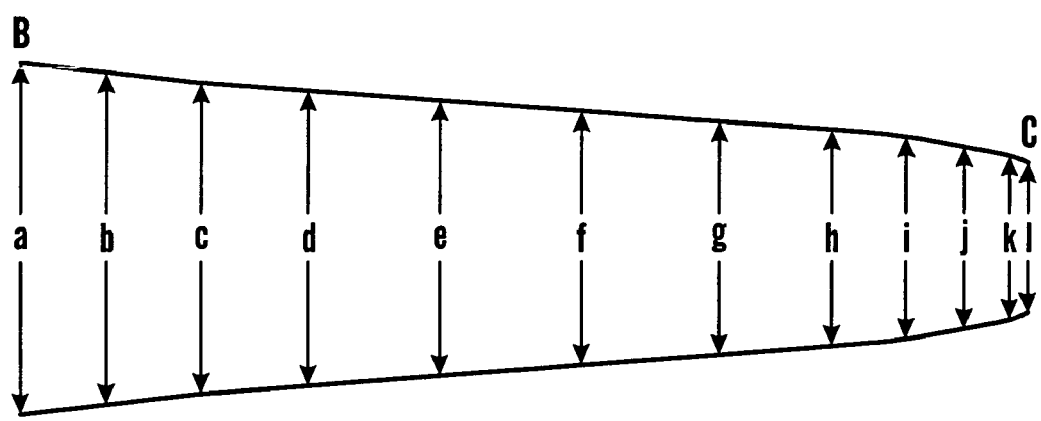
FIG. 6 is a schematic representation of a tapered waveguide of a device according to the invention.

FIG. 6 is a schematic representation of a plan view of a tapered waveguide of a device according to the invention. The tapered waveguide shown comprises a modification (in accordance with the invention) of taper section BC of the known tapered rib waveguide shown in FIG. 1. The modification comprises adjusting the angle of taper for each of eleven sections along the waveguide such that it is substantially at 0.05 degrees below the adiabatic limit for that section of the waveguide, as plotted in FIG. 4 (the dotted line). The widths, the lengths, and taper angles of each section are provided in the tables below:

| width | width/!xm | section | length/jam | Taper angle (6)/degrees |
|---|---|---|---|---|
| a | 6.40 | ab | 98 | 0.105 |
| b | 6.04 | bc | 114 | 0.090 |
| c | 5.68 | cd | 131 | 0.077 |
| d | 5.33 | de | 158 | 0.065 |
| e | 4.97 | ef | 174 | 0.059 |
| f | 4.61 | fg | 166 | 0.062 |
| g | 4.25 | gh | 132 | 0.078 |
| h | 3.89 | hi | 92 | 0.109 |
| i | 3.54 | ij | 68 | 0.152 |
| j | 3.18 | jk | 54 | 0.191 |
| k | 2.82 | kl | 19 | 0.181 |
| l | 2.70 | | | |

Simulation studies have shown that the known tapered section BC shown in FIG. 1, containing notches of cross-sectional dimension 0.5×0.5 nm as shown in FIG. 2 resulting from fabrication processing, would generate an optical loss of over 0.5 dB. In contrast, the taper section according to the invention, shown in FIG. 5 (containing notches of the same dimension) would generate an optical loss of less than 0.05 dB (i.e. the optical loss would be more than ten times lower than for the known taper section), with a taper length of 1206 μm compared to a length of 1031 μm for the known section BC of FIG. 1. To achieve an optical loss of less than 0.05 dB in the notched known section BC would require the section to be doubled in length.

The above analysis is merely an example to illustrate the advantages of the invention. The invention may also be applied to the other tapered sections of the waveguide illustrated in FIG. 1, and of course the invention is applicable generally to any tapered semiconductor waveguide.

Preferably the semiconductor of the waveguide according to the invention is silicon. (However, other semiconductors could be used.) For example, the device may comprise a "silicon-on-insulator" device in which the tapered waveguide, and preferably one or more other waveguides and/or optical elements are fabricated in a layer of silicon overlying a layer of silica, which itself overlies a substrate, preferably also of silicon.

Preferably the tapered waveguide is a rib waveguide, in which an elongate rib of the semiconductor stands proud of slab regions of the semiconductor on each side thereof. However, the invention is applicable to other types of waveguide, for example, ridge, channel, strip, etc, waveguides.

What is claimed is:

1. A device, comprising a tapered semiconductor optical waveguide which tapers, at an angle of taper with respect to a longitudinal axis of the waveguide, from a relatively wide region to a relatively narrow region, wherein the angle of taper varies along the length of the tapered waveguide such that at all points along the taper it is below, and within a substantially constant angular separation of, the adiabatic limit of the fundamental mode of the waveguide at that point along the taper.

2. The device according to claim 1, wherein said substantially constant angular separation is no greater than 80% of the adiabatic limit at any particular point along the taper.

3. The device according to claim 1, wherein said substantially constant angular separation is at least 1.0% of the adiabatic limit at any particular point along the taper.

4. The device according to claim 1, wherein said substantially constant angular separation is in the range of 0.001 degrees to 0.1 degrees.

5. The device according to claim 1, wherein the angle of taper varies along the length of the tapered waveguide such that there are at least two changes in the angle of taper.

6. The device of claim 1, wherein the tapered waveguide is a rib waveguide.

7. The device of claim 1, wherein the wide region of the tapered waveguide is a multimode region, and the narrow region of the tapered waveguide is a single mode region.

8. A device comprising a tapered semiconductor optical waveguide which tapers, at an angle of taper with respect to a longitudinal axis of the waveguide, from a relatively wide region to a relatively narrow region, wherein the angle of taper varies along the length of the tapered waveguide such that there are at least three changes in the angle of taper, and at all points along the taper the angle of taper is below the adiabatic limit of the fundamental mode of the waveguide at that point along the taper.

9. The device according to claim 8, wherein there are at least four changes in the angle of taper along the length of the tapered waveguide.

10. The device according to claim 8, wherein the tapered waveguide comprises a series of substantially straight tapered sections, each of which has a different angle of taper to that of an immediately neighboring section.

11. The device according to claim 8, wherein the angle of taper varies substantially continuously along the length of the tapered waveguide.

12. The device according to claim 8, wherein the tapered waveguide is a rib waveguide.

13. The device according to claim 8, wherein the semiconductor is silicon.

14. The device according to claim 8, wherein the wide region of the tapered waveguide is a multimode region, and the narrow region of the tapered waveguide is a single mode region.

15. A method of fabricating a tapered semiconductor optical waveguide, comprising fabricating the tapered waveguide such that the angle of taper varies along the length of the tapered waveguide such that at all points along the taper it is below, and within a constant angular separation of, the adiabatic limit of the fundamental mode of the waveguide at that point along the taper.

16. The method of claim 15, further comprising providing said substantially constant angular separation so as not to be greater than 80% of the adiabatic limit at any point long the taper.

17. The method of claim 15, further comprising providing said substantially constant angular separation so as to be at least 1.0% of the adiabatic limit at any point along the taper.

18. The method of claim 15, further comprising providing said substantially constant angular separation to be in the range between 0.001 degrees and 0.1 degree.

19. The method of claim 15, further comprising varying the angle of taper along the length of the tapered waveguide such that there are at least two changes in the angle of taper.

20. A process of fabricating a tapered waveguide, comprising fabricating the tapered waveguide such that there are at least three changes in the angle of taper along the length of the tapered waveguide, and at all points along the taper the angle of taper is no greater than the adiabatic limit of the fundamental mode of the waveguide at that point along the taper.

* * * * *